(12) United States Patent
Mui et al.

(10) Patent No.: US 7,672,594 B2
(45) Date of Patent: *Mar. 2, 2010

(54) OPTICAL COMMUNICATION SYSTEM WITH LIGHT GUIDE HAVING VARIABLE SLIDABLE POINT OF ENTRY OR EXIT

(75) Inventors: Gary K. Mui, Arlington Heights, IL (US); James J. Morikuni, Itasca, IL (US); Martin R. Pais, North Barrington, IL (US); Maninder S. Sehmbey, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 576 days.

This patent is subject to a terminal disclaimer.

(21) Appl. No.: 11/567,612

(22) Filed: Dec. 6, 2006

(65) Prior Publication Data

US 2008/0138079 A1 Jun. 12, 2008

(51) Int. Cl.
*H04B 10/12* (2006.01)
*G02B 26/08* (2006.01)
*G02B 6/42* (2006.01)

(52) U.S. Cl. .................. 398/142; 398/139; 398/156; 359/223.1; 385/25

(58) Field of Classification Search .............. 398/139, 398/141, 142, 156; 385/25; 359/223.1, 506, 359/520, 221.2
See application file for complete search history.

(56) References Cited

U.S. PATENT DOCUMENTS

| | | | |
|---|---|---|---|
| 5,101,460 A | 3/1992 | Richard | |
| 5,245,622 A | 9/1993 | Jewell et al. | |
| 5,638,469 A | 6/1997 | Feldman et al. | |
| 5,832,147 A | 11/1998 | Yeh et al. | |
| 5,978,526 A | 11/1999 | Morikuni et al. | |
| 6,075,804 A | 6/2000 | Deppe et al. | |
| 6,470,132 B1* | 10/2002 | Nousiainen et al. | 385/146 |
| 6,628,441 B1* | 9/2003 | Staiger | 398/164 |
| 6,650,843 B1* | 11/2003 | Lohr et al. | 398/156 |
| 6,765,943 B2 | 7/2004 | Jewell | |
| 2003/0087610 A1 | 5/2003 | Ono | |
| 2008/0138078 A1* | 6/2008 | Alameh et al. | 398/140 |

* cited by examiner

*Primary Examiner*—Nathan M Curs
(74) *Attorney, Agent, or Firm*—Lawrence J. Chapa

(57) ABSTRACT

An optical communication system is provided for conveying signals between multiple housing elements of a device, where respective optical detectors and optical light sources interact via a light guide associated with each communication path, where an optical signal produced by the optical light source and received by the optical detector travels a path where at least a first light redirection unit redirects the optical signal between an angle in which the optical signal travels along at least a portion of the length of the light guide, and an angle which allows the optical signal to exit the light guide. In at least some instances, the multiple housing elements correspond to at least a pair of housing elements that are incorporated as part of a communication device having a slider configuration. In some of the same or still further instances, one or more of the light redirection units are diffractive optical elements. In some instances, one or more of the light redirection units are reflectors.

20 Claims, 5 Drawing Sheets

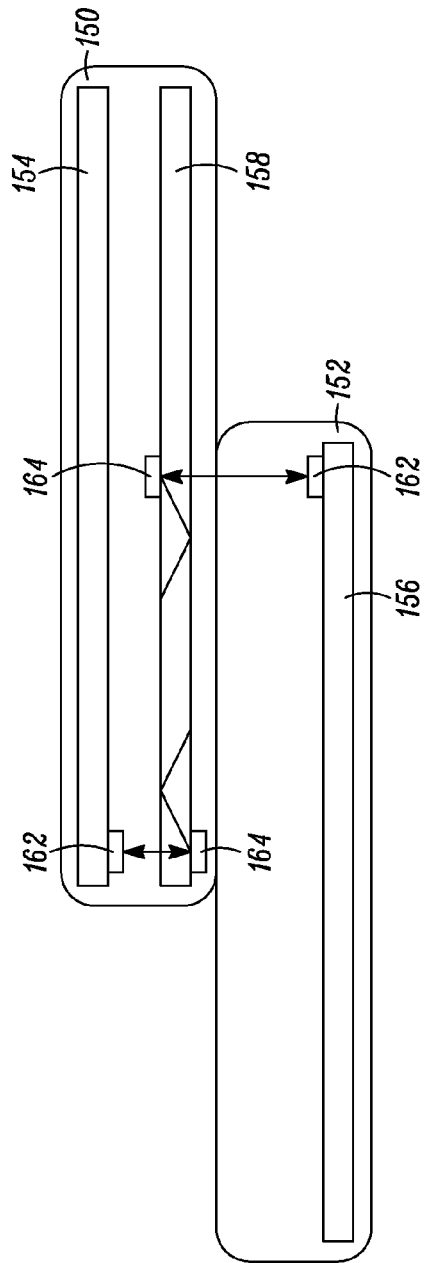
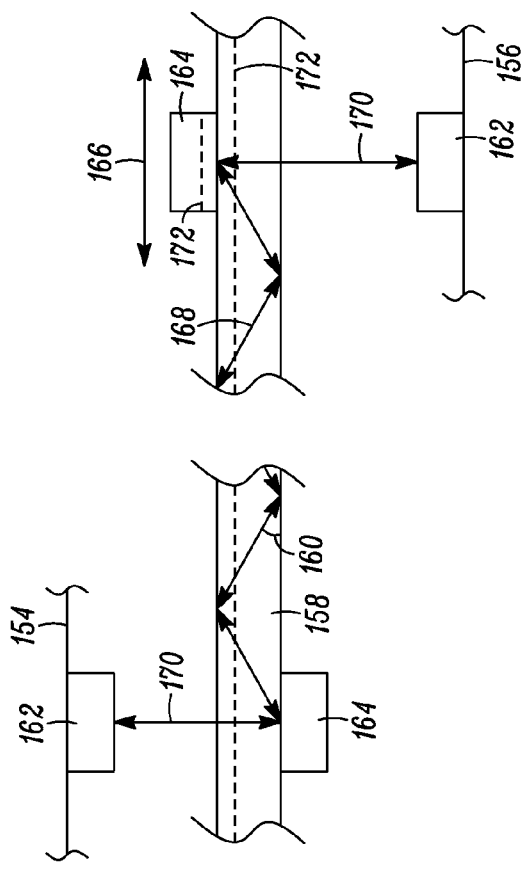

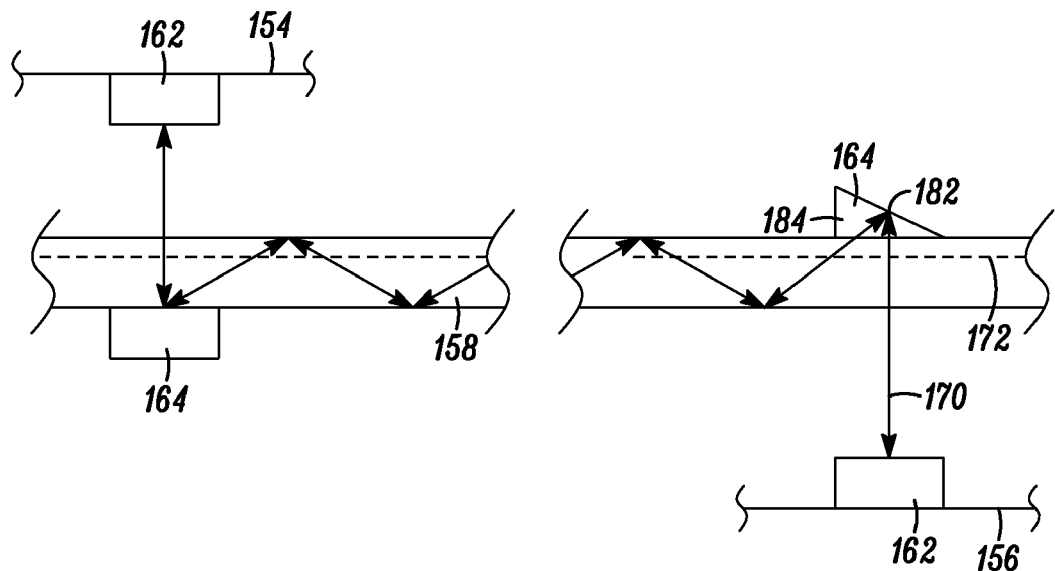
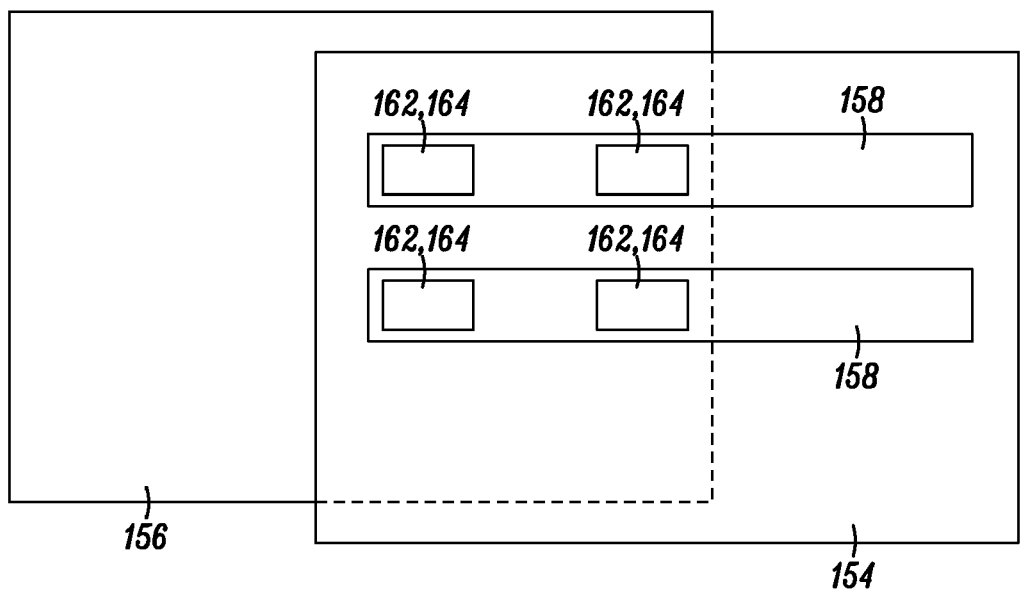
FIG. 8

OPTICAL COMMUNICATION SYSTEM WITH LIGHT GUIDE HAVING VARIABLE SLIDABLE POINT OF ENTRY OR EXIT

FIELD OF THE INVENTION

The present invention relates generally to a communication system between multiple housing elements of a device, which are adapted to move relative to one another, and more particularly, to an optical communication system with light guide, where the point of entry or exit of the optical signal can be varied along the length of the light guide during the movement of the housing elements.

BACKGROUND OF THE INVENTION

Slider devices, such as cellular telephones, represent a further form factor in addition to clam shells, candy bars, as well as others, which has enjoyed a degree of customer acceptance. In a device having a slider configuration, the two housing portions will generally shift laterally relative to one another, with each of the two housing portions typically traveling along respective paths, that are generally parallel to one another. The slider configuration enables a form factor, which is more compact when not in use, where the two housing portions are allowed to more substantially overlap or nest. When in use, the two housing portions move apart or expand to provide a device with greater surface area to simultaneously support a larger exposed keypad and display, and/or to provide greater length or distance between the microphone and speaker to better bridge the gap defined by the distance between the user's mouth and the user's ear.

However because the components which support processing of signals and/or the supply of power are each often limited to one of the two housing portions, while elements which need to receive power or access to the processing capabilities of the device are spread across both of the housing portions, the conveyance of power or signals between the two housing portions need to be supported. Power supplying devices, such as batteries, are commonly positioned within a base portion of the device. In the same or other instances, the primary processing element, such as a microprocessor, may be located in one of the two housing portions, such as the base portion, and may need to communicate with elements located in one or both of the two housing portions including instances in which a communication connection with an element in the other housing portion is desired. The base portion also commonly includes the keypad, communication circuitry, and the microphone. The slider portion often includes a display and a speaker, as well as sometimes a camera. It is further envisioned that the slider portion may also increasingly incorporate biometric sensors, such as a fingerprint sensor. In order to support the increasing number of electrical elements, as well as elements having larger size and increasing resolution (i.e. displays and/or cameras) in a multiple housing element device, such as a slider type configuration form factor, communication connections that support a larger number of signals and/or higher data rates are becoming increasingly important. Both of which are complicated by the need for the signals to be routed through the coupling element, such as a hinge element or a slider mechanism, which couples the multiple housing elements together.

Increases in the amount of data being communicated in an existing number of communication connections will often involve data signals having higher data rates, which can result in a corresponding increase in the amount of electromagnetic energy often characterized as noise and interference, in the case where the electrical signals are conveyed by one or more electrical conductors. In some instances, it may be possible to provide at least some electromagnetic shielding to help alleviate and/or address the production of any unwanted noise or interference. However, in the case where the signals are being routed though a coupling element which supports a movable coupling of a two part housing, accounting for any increases in electromagnetic noise and interference may be problematic, as there can be difficulties associated with providing suitable electromagnetic shielding.

Traditionally, communications between housing portions in at least some instances have been supported using a flexible circuit, which contains one or more signaling paths. Opposite ends of the flexible circuit are generally coupled to respective ones of the two housings, and the length of the flexible circuit is often allowed to include one or more overlapping folds that include one or more bends to selectively create a varying amount of unrealized length, which can accommodate relative movement of the two ends between positions where the two ends are selectively closer and farther apart as the two housings move relative to one another. In order to accommodate a bend in the flexible circuit, the various layers are sometimes separated. The separation of any shield layers relative to the layers containing signal conveying conductors will often impact the effectiveness of the shield layers proximate the point of any separation. Furthermore the use of a flexible circuit for purposes of conveying electrical signals and the corresponding provision for overlapping folds to account for the movement between housing portions and corresponding communication endpoints, contributes to a requirement for an often meaningful amount of space or volume to accommodate the communication pathways, where space or volume may be at a premium in devices where overall reductions in size are typically strongly desired.

At least one communication standard, namely the Mobile Industry Processor Interface (MIPI) standard, attempts to alleviate some of the concerns by incorporating serialized communications, to help minimize the number of connections, and at least partially incorporates the use of differential signaling to help reduce the amount of electromagnetic noise and interference associated with the use of relatively higher frequency communication signals. While, the use of differential signaling may help to reduce some of the noise, in some instances it still may not be sufficient.

The present inventors have recognized that electromagnetic noise and interference, which continues to be present even with the use of differential signaling, can be largely avoided by optically conveying the data signals, as opposed to electrically conveying the same. Further, the inventors have recognized that maintaining the integrity of an optical communication path in a manner which reduces the space requirements, while accommodating the relative movement of multiple housing parts, portions or elements and supporting the ability to communicate information between the multiple housing parts is also desirable. Correspondingly, the present inventors have recognized that a system including an optical light source and an optical detector, which allows the optical light source to move relative to a corresponding optical detector as the respective housing parts, portions or elements move relative to one another, while maintaining a communication connection would be beneficial.

SUMMARY OF THE INVENTION

The present invention provides an optical communication system for conveying signals between a first and a second housing element of a device, where the first and second housing elements are adapted to move relative to one another. The communication system includes an optical light source, coupled to one of the first and second housing elements, which produces light in a direction of travel having an angle. The communication system further includes an optical detector coupled to the other one of the first and second housing element, to which the optical light source is not coupled. The communication system still further includes a light guide, which has a length that corresponds to the length of intended movement of the first housing element relative to the second housing element. When the first housing element moves relative to the second housing element, at least one of the optical light source and the optical detector at least partially travels along the length of the light guide. Further yet, the communication system includes a first light redirection unit, associated with one of the optical light source and the optical detector. The first light redirection unit is located proximate the light guide at a variable position along the length of the light guide corresponding to a current position of the associated one of the optical light source and the optical detector relative to the length of the light guide. The first light redirection unit which redirects the angle of the direction of travel of the light produced by the optical light source relative to the light guide, between an angle which will allow the light to be largely confined by the light guide as the light travels along the length of the light guide, and an angle which will allow the light to exit the light guide.

In at least one embodiment, the optical communication system further includes a second light redirection unit, associated with the other one of the optical light source and the optical detector, with which the first light redirection unit is not associated. The second light redirection unit is located proximate the light guide at a variable position along the length of the light guide corresponding to a current position of the associated one of the optical light source and the optical detector relative to the length of the light guide. The second light redirection unit redirects the angle of the direction of travel of the light produced by the optical light source relative to the light guide, between an angle which will allow the light to be largely confined by the light guide as the light travels along the length of the light guide, and an angle which will allow the light to exit the light guide.

In at least a further embodiment, the optical light source, optical detector, light guide, and first light redirection unit form a communication channel, and the optical communication system includes a plurality of communication channels.

In a still further embodiment, the first and second housing elements are incorporated as part of a communication device having a slider configuration.

The present invention further provides a wireless communication device, which has a two part housing including a first housing element and a second housing element adapted to move relative to one another, and an optical communication system for conveying signals between the first housing element and the second housing element. The optical communication system includes an optical light source, coupled to one of the first and second housing elements, which produces light in a direction of travel having an angle. The communication system further includes an optical detector coupled to the other one of the first and second housing element, to which the optical light source is not coupled. The communication system still further includes a light guide, which has a length that corresponds to the length of intended movement of the first housing element relative to the second housing element. When the first housing element moves relative to the second housing element, at least one of the optical light source and the optical detector at least partially travels along the length of the light guide. Further yet, the communication system includes a first light redirection unit, associated with one of the optical light source and the optical detector. The first light redirection unit is located proximate the light guide at a variable position along the length of the light guide corresponding to a current position of the associated one of the optical light source and the optical detector relative to the length of the light guide. The first light redirection unit which redirects the angle of the direction of travel of the light produced by the optical light source relative to the light guide, between an angle which will allow the light to be largely confined by the light guide as the light travels along the length of the light guide, and an angle which will allow the light to exit the light guide.

These and other features, and advantages of this invention are evident from the following description of one or more preferred embodiments of this invention, with reference to the accompanying drawings.

BRIEF DESCRIPTION OF THE DRAWINGS

FIGS. 3A and 3B are cut away side views illustrating the interaction of elements of an optical communication system in multiple use positions, which support the conveyance of an optical communication signal between multiple housing parts of a device, in accordance with at least one embodiment of the present invention;

FIG. 4 is an enlarged partial side view of at least some of the elements of the optical communication system, illustrated in FIGS. 3A and 3B;

FIG. 7 is an enlarged partial side view of an optical communication system of the type illustrated in FIGS. 3A and 3B, where at least one of the light redirection unit includes an angled reflective surface, in accordance with a further embodiment of the present invention; and FIG. 8 is partial internal plan view illustrating an optical communication system including a plurality of communication channels for conveying communication signals between multiple housing portions of a device, which move relative to one another, in accordance with at least one embodiment of the present invention.

DETAILED DESCRIPTION OF THE PREFERRED EMBODIMENT(S)

Figure 1:
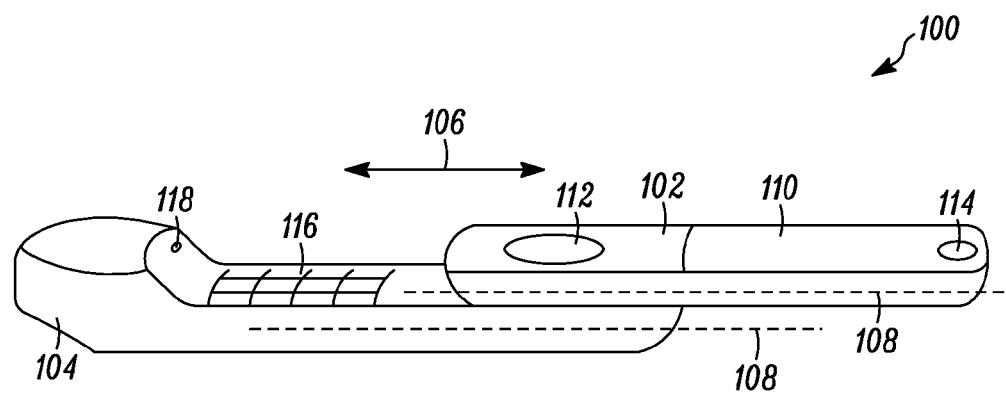
FIG. 1 is an exemplary wireless communication device having a two part housing, which each move relative to one another along a substantially parallel path.

While the present invention is susceptible of embodiment in various forms, there is shown in the drawings and will hereinafter be described presently preferred embodiments with the understanding that the present disclosure is to be considered an exemplification of the invention and is not intended to limit the invention to the specific embodiments illustrated.

FIG. 1 illustrates an exemplary wireless communication device 100 having a two part housing including an upper housing 102 or slider portion, and a lower housing 104 or base portion, which each move 106 relative to one another along a substantially parallel path 108, where the two part housing corresponds to a slider configuration. In the illustrated example, the upper housing 102 includes a display area 110, a user input area 112 and one or more speaker ports 114. The user input area can include one or more of a navigational input section for example allowing for the four-way movement of a cursor on the display (i.e. up, down, left and right), and a selection input section for example allowing for the selection of highlighted display elements. In some instances, at least portions of the navigational input section may overlap portions of the selection input section. The lower housing 104 includes a further user input section in the form of a keypad 116, as well as a microphone 118. In some instances, at least one of the upper housing 102 and the lower housing 104 may additionally include a camera.

Generally, one of the upper housing 102 and the lower housing 104 will include a power supply, such as a battery, as well as computing capabilities, such as a microprocessor. However, because both housing parts will often have elements that require one or both of power, data and/or control signals, and some of the elements will not be co-located relative to a particular housing element, with respect to the element that supplies the power, data and/or control signals, signals will commonly need to be conveyed between the upper and lower housings 102 and 104.

Figure 2A:
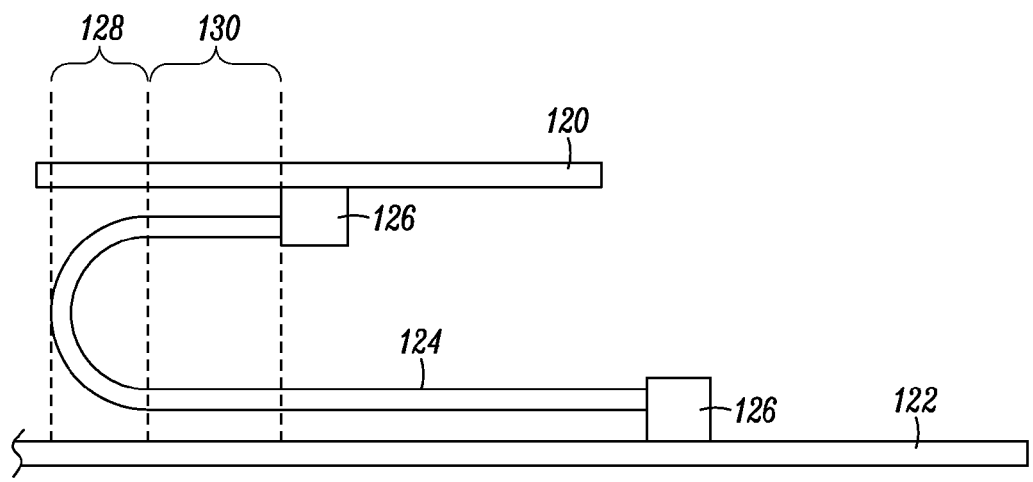
FIGS. 2A and 2B are partial side views internal to a wireless communication device, which illustrate the interaction of communication elements associated with and supporting communication between multiple housing portions in multiple use positions, in accordance with at least one exemplary prior system.
Figure 2B:
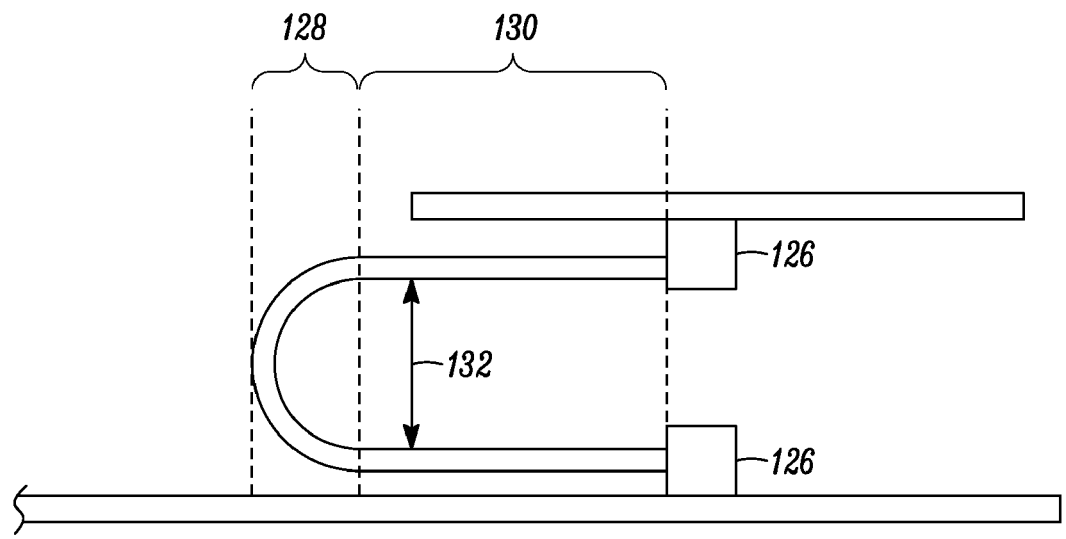

FIGS. 2A and 2B illustrate partial side views internal to a wireless communication device, which show the interaction of communication elements associated with and supporting communication between multiple housing portions in multiple use positions, in accordance with at least one exemplary prior system. The exemplary prior system includes a pair of substrates 120 and 122, such as a printed circuit board, where each of the substrates 120 and 122 are generally associated with a corresponding one of the upper housing 102 and the lower housing 104. More specifically, substrate 120, as illustrated, is part of and/or contained within the upper housing 120, and substrate 122 is part of and/or contained within the lower housing.

As the upper and lower housings 102 and 104 move relative to one another, the corresponding substrates 120 and 122 similarly move relative to one another. In order to accommodate the relative movement and still maintain a communication connection, as noted above, at least some prior systems have incorporated a flexible circuit 124, where the ends 126 of the flexible circuit 124 are each coupled to a respective one of the substrates 120 and 122. The path of the flexible circuit 124 generally incorporates a fold 128, which accommodates a variable length overlapping section 130. As the substrates 120 and 122 move relative to one another, the amount of overlap changes, and the position of the portion of the flexible circuit 124 that folds travels along the overall length of the flexible circuit 124. In order to enable such an interaction to occur relatively unhindered, a certain predefined distance 132 is maintained between the overlapping segments, which is largely otherwise unoccupied.

Figure 3A:
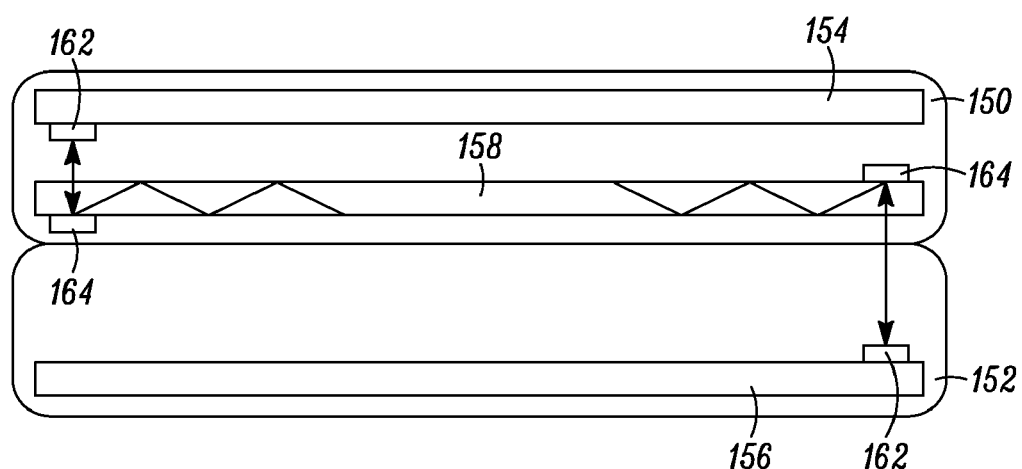

FIGS. 3A and 3B illustrate cut away side views showing the interaction of elements of an optical communication system in multiple use positions, which support the conveyance of an optical communication signal between multiple housing parts of a device, in accordance with at least one embodiment of the present invention. In each of FIGS. 3A and 3B, an upper housing 150 and a lower housing 152 are illustrated in a pair of use positions, between which the housing elements have moved relative to one another. FIG. 3A illustrates the upper and lower housings 150 and 152 in a position more closely associated with a closed position, and FIG. 3B illustrates the upper and lower housings 150 and 152 in a position more closely associated with an open position.

In each instance, the upper and lower housings 150 and 152 are each shown including a respective substrate 154, 156, such as a printed circuit board, to which one or more components can be coupled, and which move with the respective movement of the upper and lower housing 150, 152. One of the upper and lower housings additionally includes a light guide 158, which has a length corresponding to at least the length of the intended movement of the upper housing element 150 relative to the lower housing element 152. In the illustrated embodiment, the light guide 158 is included as part of the upper housing 150. Generally, the light guide 158 includes an optically transparent medium through which an optical signal can be conveyed. The light associated with the optical signal is intended to have an incident angle relative to the surface of the light guide 158 that enables the light associated with the optical signal to travel within the light guide 158 and be largely retained and conveyed along the length of the light guide 158, unless or until the angle of incidence 160 (FIG. 4) is adjusted so as to allow the light to escape from the confines of the light guide 158.

Each substrate 154 and 156 includes one or more optical elements 162, such as an optical light source and/or an optical detector, which respectively produces an optical signal or detects an optical signal. An optical element 162 associated with one of the upper and lower housing 150 or 152 is generally paired with an optical element 162 of the other one of the upper and lower housing 150 or 152. Within the pair of optical elements 162, at least one of the optical elements 162 includes the capabilities of an optical light source and at least the other optical element of the pair includes the capabilities of an optical detector. In this way, light produced by one of the optical elements 162, which reaches the other one of the pair of optical elements 162, can be detected. In some instances, it is possible that both optical elements 162, which form a pair, could each have the capability to produce an optical signal and detect an optical signal, and in essence have optical transceiver capabilities. In such an instance, the receive portion of the optical transceiver and the transmit portion of the optical transceiver can be selectively enabled to avoid interfering with the communication of any data in an opposite direction.

Alternatively, the light produced by the optical transmitter portion of the transceiver could be coded so as to be incompatible with the optical receiver portion of the transceiver, and thus reduce the potential for interference. However, in such an instance the other optical element 162 of the pair would need to be matched to be compatible with the respective complementary transmit/receive characteristics of the first optical element 162. For example, one transceiver of the pair could be adapted to transmit at a frequency corresponding to a first frequency of light (i.e. blue light), and receive at an alternative second frequency of light (i.e. red). The other transceiver of the pair could be adapted to transmit at the alternative second frequency of light (i.e. red light), and receive at the first frequency of light (i.e. blue). In this way, an optical communication signal in each direction within a particular communication channel associated with a particular light guide could be simultaneously supported while reducing the chances of interference between the two signals.

Still further it is possible that the channel could be divided into subchannels, where the transmit portion of the first transceiver and the receive portion of the second transceiver share a first subdivision of the channel, and the transmit portion of the second transceiver and the receive portion of the first transceiver share a second subdivision of the channel. Such an embodiment assumes that there is sufficient isolation between the subchannels so as to sufficiently avoid any interference which might preclude the corresponding communication of data.

In order to alter or adjust the angle of incidence at a desired point, such as a desired point of entry or a point of exit, the optical communication system includes a light redirection unit 164, which is associated with at least one of the optical elements 162. The light redirection unit 164 is located proximate the light guide 158 at a position along the length of the light guide 158 corresponding to the current position of the associated one of the optical element 162.

In the illustrated embodiment, because the optical element 162 associated with the upper housing 150, is largely fixed in regards to its position along the length of the light guide 158, which is similarly associated with the upper housing 150, the associated light redirection unit 164 generally does not need to travel along the length of the light guide 158. Alternatively, because the optical element 162 associated with the lower housing 152, does travel along the length of the light guide dependent upon the relative position of the upper and lower housings 150 and 152, in order for the light to enter or exit the light guide at a position corresponding to the optical element 162 of the lower housing 152, the light guide similarly travels 166 (FIG. 4) along the length of the light guide 158 with corresponding optical element 162.

FIG. 4 illustrates an enlarged partial side view of at least some of the elements of the optical communication system, illustrated in FIGS. 3A and 3B. In such an arrangement, an anticipated light path 168 has a vertical component 170 proximate each of the two optical elements 162, which allows the light to traverse the distance from the corresponding optical element's mounting, relative to the respective substrate 154 or 156, to the light guide 158. The light path 168 has multiple components for traveling along the length of the light guide 158 in a generally horizontal direction, which except for the point of entry or exit has an angle of incidence 160 that allows the light to remain largely confined within the light guide 158, which results from the interaction of the light entering the light guide with the light redirection unit 164. In at least some embodiments, the light redirection unit 164 is a diffractive optical element, such as a hologram, which can alter the incident angle of the light reflected from the surface of the diffractive optical element so as to be different than the angle of incidence of the incoming light. Such an interaction can occur at each of the points that light is intended to enter or exit the light guide 158.

In at least some instances, the light redirection unit 164 is in substantial contact with the surface of the light guide 158 at the point of redirection of the optical signal, so as to substantially avoid a space between the light guide 158 and the light redirection unit 164 in which air or another substance having a relatively low index of refraction can reside, which in turn might affect the ability of the light redirection unit to properly direct the light.

As noted previously, at least one of the light redirecting units 164 may travel with the associated optical element 162 along at least a portion of the length of the light guide 158. Because in some instances it may be desirable for the light redirection unit 164 to be in close contact with the light guide 158, in some instances it may be beneficial to incorporate a low friction coating or surface 172, to allow for the light redirection unit 164 to slide more smoothly relative to the light guide 158. Preferably, the coating would have an index of refraction that was consistent with either the light guide 158 or the light redirection unit 164, or would have an index of refraction that could otherwise be accounted for, so as to still produce the desired change in the angle of incidence at the junction between the light guide 158 and light redirection unit 164. A dashed line in each of the light guide 158 and the light redirection unit 164 identify the positioning of a possible low friction coating or surface 172 on one or both of elements. An example of at least one possible low friction coating or material includes Polytetrafluoroethylene, which is sometimes alternatively referred to as Teflon®.

Figure 5:
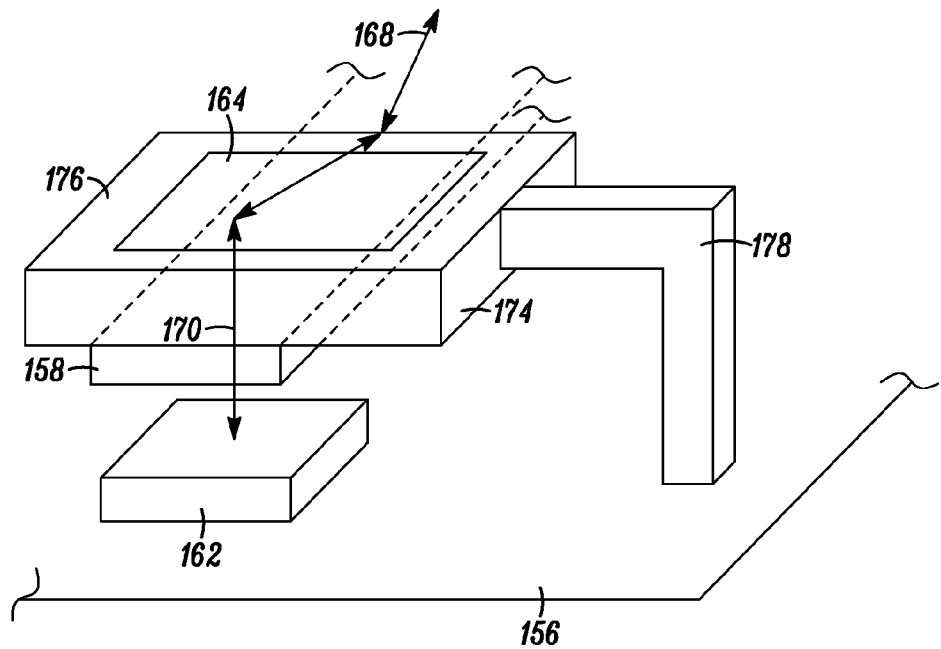
FIG. 5 is an enlarged partial isometric view of at least some of the elements of the optical communication system, illustrated in FIGS. 3A and 3B.

In order to support the movement of at least one of the light redirection units 164, in some instances, a carrier 174 coupled to the substrate 156, that the associated optical element 162 is similarly coupled, can be used. FIG. 5 illustrates an enlarged partial isometric view of at least some of the elements of the optical communication system, illustrated in FIGS. 3A and 3B, including at least one example of a carrier 174 for the light redirection unit 164. In the illustrated embodiment, the carrier 174 includes a frame 176 coupled to an arm 178, which in turn is coupled to the substrate 156. The arm 178 allows motion associated with the substrate 156 to be translated to the light redirection unit 164, which is encapsulated by the frame 176. The frame 176 helps to properly position the redirection unit 164 with respect to the light guide 158 and the optical element 162. The frame 176 provides a surface to which the arm 178 can be coupled, where it otherwise might not be convenient to be coupled more directly to the light redirection unit 164.

Figure 6:
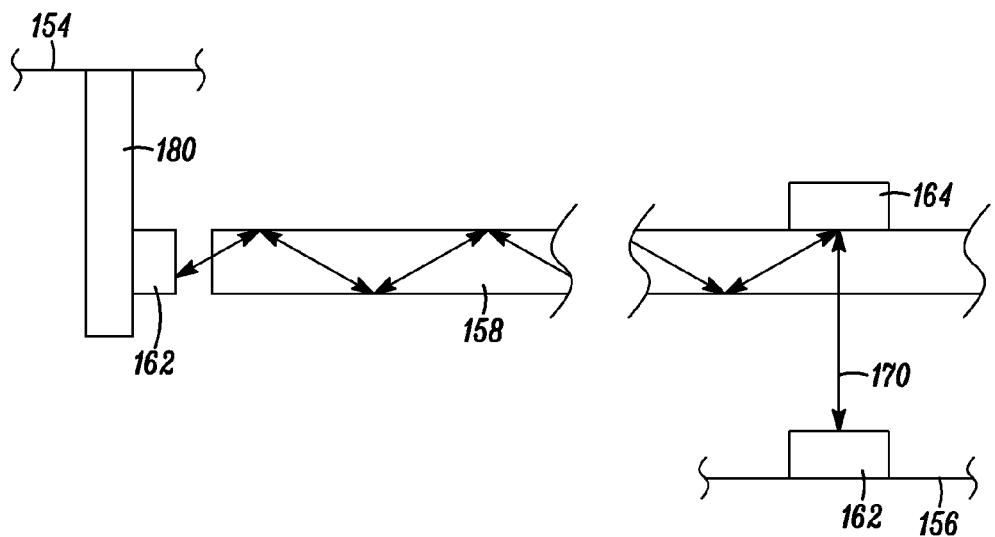
FIG. 6 is an enlarged partial side view of an optical communication system of the type illustrated in FIGS. 3A and 3B, where one of the optical elements is alternatively positioned relative to the light guide, in accordance with a further embodiment of the present invention.

FIG. 6 illustrates an enlarged partial side view of an optical communication system of the type illustrated in FIGS. 3A and 3B, where one of the optical elements is alternatively positioned relative to the light guide, in accordance with a further embodiment of the present invention. In the illustrated embodiment, one of the optical element 162 is alternatively positioned to enable light to enter or exit the light guide without the assistance of a light redirection unit 164. The light enters or exits the light guide, where the light has a direction of travel having an angle that is between parallel to the intended direction of travel of light along the length of the light guide 158 and the maximum angle of incidence 160 which allows the light to remain largely confined within the light guide 158 (i.e. total internal reflection) while traveling along the length of the light guide 158.

As noted above in connection with the embodiment illustrated in FIGS. 3A and 3B, in some instances, at least one of the optical elements 162 may not need to move relative to the light guide 158. In such an instance, it may be possible to alternatively position the optical element 162, which does not need to be adapted to travel along the length of the light guide 158, such that the light can enter or exit the light guide 158 from or to the optical element 162 proximate one of the ends of the light guide 158 without having to redirect the angle of incidence associated with the light as it traverses along the length of the light guide 158. In the illustrated embodiment, the optical element 162 is offset from the surface of the substrate 154 via a spacer 180, so as to coincide with an end of the light guide 158. As shown, the spacer 180 can be a further substrate in the form of a printed circuit board, which is coupled to the main substrate 154 at an angle (i.e. approximately 90 degrees).

FIG. 7 illustrates an enlarged partial side view of an optical communication system of the type shown in FIGS. 3A and 3B, where at least one of the light redirection units 164 includes an angled reflective surface 182, in accordance with a further embodiment of the present invention. Similar, to the light redirection unit 164 illustrated in FIG. 4, the alternative embodiment could similarly be adapted to move with appropriate modification of the carrier 174 and/or other corresponding structure.

In the illustrated embodiment, the angled reflective surface 182 is associated with a structure 184 having a triangular cross section, which has a surface that coincides with and is intended to travel along the light guide 158. The additional structure is optically transparent and preferably is formed from a material having an index of refraction that is more closely proximate and/or higher than the index of refraction of the material from which the light guide 158 is formed. Such an index of refraction for the triangular cross section allows for light to reflect off of the angled reflective surface 182 and back toward and into the light guide while reducing the chances of the light exiting from the opposite side of the light guide 158.

In at least some instances, the angled reflective surface 182, as an alternative form of the light redirection unit 164, is associated with the particular optical element 162 of the associated pair that operates as an optical light source. Furthermore, in order to avoid the presence of air or other material having a low index of refraction from being present between the light guide 158 and the light redirection unit 164 in the form of an angled reflective surface 182 additionally includes a further optically transmissive material in the form of a corresponding structure 184, which substantially fills the space between the angled reflective surface and the surface of the light guide 158, and which is positioned substantially adjacent the light guide 158. In the illustrated embodiment the corresponding structure 184 has a cross section, corresponding to a triangle, with one edge corresponding to the reflective surface and the other edge corresponding to a surface, which closely interacts with the light guide 158. However, other cross sectional shapes are possible without deviating from the teachings of the present invention. A low friction coating or surface 172 on at least one of the light guide 158 and the light redirection unit 164 may be beneficial, in order to allow the corresponding structure 184 of the light redirection unit 164 to closely interact with the light guide 158, while minimizing the frictional interaction.

In accordance with a potential alternative embodiment, an intermediate element formed from a low friction material could be positioned between the light guide 158 and the light redirection unit 164, in place of or in addition to the identified coating 172, so as to minimize the frictional interaction, where a low friction intermediate element could be placed along at least the portion of the length of the light guide 158 that the light redirection unit 164 is likely to travel, and/or a low friction intermediate element could be associated with the light redirection unit, where the intermediate element could travel with light redirection unit 164, as the light redirection unit 164 travels along the length of the light guide 158 with the associated optical element 162.

FIG. 8 is a partial internal plan view illustrating an optical communication system including a plurality of communication channels for conveying communication signals between multiple housing portions of a device, which move relative to one another, in accordance with at least one embodiment of the present invention. In such an instance the communication path associated with a particular pair of optical elements 162, corresponding light guide 158 and light redirection unit(s) 164, can be replicated to form a plurality of optical communication paths. Generally, in at least some embodiments, the communication paths will be substantially parallel to one another, and will be oriented to extend in the same direction as the relative movement of the two housing. In this way multiple communication paths may be supported, where in some instances a pair of paths may support unidirectional traffic in opposite directions.

Furthermore, while the multiple housings have been generally shown to move relative to one another along substantially parallel paths that are generally straight, the substantially parallel paths can alternatively include a curved track without departing from the teachings of the present invention, where the light guide could similarly be curved to follow the relative movement of the housings, and the optical elements and the light redirection unit(s), which travel along at least a portion of the length of the light guide, could follow a similarly curved path.

While the preferred embodiments of the invention have been illustrated and described, it is to be understood that the invention is not so limited. Numerous modifications, changes, variations, substitutions and equivalents will occur to those skilled in the art without departing from the spirit and scope of the present invention as defined by the appended claims.

What is claimed is:

1. An optical communication system for conveying signals between a first and a second housing element of a device, where the first and second housing elements are adapted to move relative to one another, the communication system comprising:

an optical light source for producing light in a direction of travel having an angle, the optical light source being coupled to one of the first and second housing elements;

an optical detector coupled to the other one of the first and second housing element, to which the optical light source is not coupled;

a light guide having a length corresponding to the length of intended movement of the first housing element relative to the second housing element, where at least one of the optical light source and the optical detector travels along at least partially the length of the light guide, when the first housing element moves relative to the second housing element; and a first light redirection unit, associated with one of the optical light source and the optical detector, where the first light redirection unit is located proximate the light guide at a variable position along the length of the light guide corresponding to a current position of the associated one of the optical light source and the optical detector relative to the length of the light guide, which redirects the angle of the direction of travel of the light produced by the optical light source relative to the light guide, between an angle which will allow the light to be largely confined by the light guide as the light travels along the length of the light guide, and an angle which will allow the light to exit the light guide.

2. An optical communication system in accordance with claim 1, further comprising a second light redirection unit, associated with the other one of the optical light source and the optical detector, with which the first light redirection unit is not associated, where the second light redirection unit is located proximate the light guide at a variable position along the length of the light guide corresponding to a current position of the associated one of the optical light source and the optical detector relative to the length of the light guide, which redirects the angle of the direction of travel of the light produced by the optical light source relative to the light guide, between an angle which will allow the light to be largely confined by the light guide as the light travels along the length of the light guide, and an angle which will allow the light to exit the light guide.

3. An optical communication system in accordance with claim 1, wherein the light redirection unit is a diffractive optical element.

4. An optical communication system in accordance with claim 3, wherein the diffractive optical element is positioned substantially adjacent the light guide.

5. An optical communication system in accordance with claim 4, further comprising a low friction material positioned between the diffractive optical element and the light guide.

6. An optical communication system in accordance with claim 4, wherein at least one of the light guide and the diffractive optical element has a friction reducing coating.

7. An optical communication system in accordance with claim 6, wherein the friction reducing coating is located on at least a portion of the surface of the at least one of the light guide and the diffractive optical element, which interacts, either directly or indirectly, with the other one of the light guide and the diffractive optical element.

8. An optical communication system in accordance with claim 1, wherein the light redirection unit is reflector associated with the optical light source.

9. An optical communication system in accordance with claim 1, wherein the optical light source produces a light in a direction of travel having an angle that is substantially perpendicular to the direction of travel of light along the length of the light guide.

10. An optical communication system in accordance with claim 1, wherein the optical detector is oriented to receive light in a direction of travel having an angle that is substantially perpendicular to the direction of travel of light along the length of the light guide.

11. An optical communication system in accordance with claim 1, wherein the first light redirection unit and the associated one of the optical light source and the optical detector are located on opposite sides of the light guide relative to a substantially common point along the length of the light guide.

12. An optical communication system in accordance with claim 1, wherein the light guide is coupled to one of the first and second housing elements.

13. An optical communication system in accordance with claim 12, wherein the one of the optical light source and the optical detector, which is coupled to the same one of the first and second housing that is coupled to the light guide, is substantially fixed in place along the length of the light guide.

14. An optical communication system in accordance with claim 1, wherein the optical light source, optical detector, light guide, and first light redirection unit form a communication channel, and wherein the optical communication system includes a plurality of communication channels.

15. An optical communication system in accordance with claim 14,
wherein the plurality of communication channels includes at least a first communication channel and a second communication channel; and
wherein the optical light source of the first communication channel is coupled to the first housing and the optical detector of the first communication channel is coupled to the second housing, and the optical light source of the second communication channel is coupled to the second housing and the optical detector of the second communication channel is coupled to the first housing.

16. An optical communication system of claim 1 wherein the first and second housing elements travel along respective substantially parallel planes.

17. An optical communication system of claim 1 wherein the first and second housing elements are incorporated as part of a communication device having a slider configuration.

18. An optical communication system of claim 17 wherein the communication device is a radio telephone.

19. A wireless communication device comprising:
a two part housing including a first housing element and a second housing element adapted to move relative to one another; and
an optical communication system for conveying signals between the first housing element and the second housing element, the communication system including
an optical light source for producing light in a direction of travel having an angle, the optical light source being coupled to one of the first and second housing elements;
an optical detector coupled to the other one of the first and second housing element, to which the optical light source is not coupled;
a light guide having a length corresponding to the length of intended movement of the first housing element relative to the second housing element, where at least one of the optical light source and the optical detector travels along at least partially the length of the light guide, when the first housing element moves relative to the second housing element; and
a first light redirection unit, associated with one of the optical light source and the optical detector, where the first light redirection unit is located proximate the light guide at a variable position along the length of the light guide corresponding to a current position of the associated one of the optical light source and the optical detector relative to the length of the light guide, which redirects the angle of the direction of travel of the light produced by the optical light source relative to the light guide, between an angle which will allow the light to be largely confined by the light guide as the light travels along the length of the light guide, and an angle which will allow the light to exit the light guide.

20. A wireless communication device of claim 19 wherein the first and second housing elements are incorporated as part of a communication device having a slider configuration.

* * * * *